United States Patent
Amurri et al.

(10) Patent No.: US 9,333,720 B2
(45) Date of Patent: May 10, 2016

(54) PROCESS AND APPARATUS FOR BUILDING TIRES FOR VEHICLE WHEELS

(75) Inventors: Cesare Emanuele Amurri, Milan (IT); Maurizio Marchini, Milan (IT); Gianni Mancini, Milan (IT)

(73) Assignee: Pirelli Tyre S.p.A., Milan (IT)

( * ) Notice: Subject to any disclaimer, the term of this patent is extended or adjusted under 35 U.S.C. 154(b) by 0 days.

(21) Appl. No.: 13/383,793

(22) PCT Filed: Jun. 15, 2010

(86) PCT No.: PCT/IB2010/052659
§ 371 (c)(1),
(2), (4) Date: Jan. 12, 2012

(87) PCT Pub. No.: WO2011/007269
PCT Pub. Date: Jan. 20, 2011

(65) Prior Publication Data
US 2012/0111461 A1    May 10, 2012

(30) Foreign Application Priority Data
Jul. 13, 2009  (IT) .............................. MI2009A1238

(51) Int. Cl.
*B29D 30/28*    (2006.01)
*B29D 30/14*    (2006.01)
(Continued)

(52) U.S. Cl.
CPC ............... *B29D 30/14* (2013.01); *B29D 30/28* (2013.01); *B29D 30/60* (2013.01); *B29D 2030/3071* (2013.01); *Y10T 152/10* (2015.01)

(58) Field of Classification Search
CPC ............... B29D 30/15; B29D 30/1621; B29D 30/1628; B29D 2030/1671; B29D 30/28; B29D 30/3021; B29D 30/3028; B29D 2030/3071; B29D 30/60; B29D 30/604
USPC .............. 156/117, 130.3, 397, 408, 409, 412, 156/413, 421, 421.6
See application file for complete search history.

(56) References Cited

U.S. PATENT DOCUMENTS 1,996,129 A * 4/1935 Thurman ............... B29D 30/58
                                                                    156/413
2,376,494 A * 5/1945 Larabee ........................ 100/153
(Continued)

FOREIGN PATENT DOCUMENTS

DE    11 2006 003 984 T5    6/2009
EP        1 199 148 A1      4/2002
(Continued)

OTHER PUBLICATIONS

Machine generated English language translation of JP 11-129347 (original document dated May 1999).*
(Continued)

*Primary Examiner* — Martin Rogers
(74) *Attorney, Agent, or Firm* — Finnegan, Henderson, Farabow, Garrett & Dunner, L.L.P.

(57) ABSTRACT

A process and an apparatus for building tires for vehicle wheels wherein the process includes the step of assembling components of elastomeric material on a forming support, in which at least one of the components of elastomeric material is manufactured by the steps of: i) dispensing a continuous elongated element of elastomeric material; ii) applying the continuous elongated element in the form of coils disposed in side by side relationship or at least partly superposed, wound up on the forming support, so as to form the at least one component of elastomeric material of the tire; iii) exerting a first pressure on a central region of a portion of the continuous elongated element applied onto the forming support; and iv) exerting a second pressure on side regions of the portion of the continuous elongated element applied onto the forming support.

9 Claims, 8 Drawing Sheets

(51) Int. Cl.
B29D 30/60 (2006.01)
B29D 30/30 (2006.01)

(56) References Cited

U.S. PATENT DOCUMENTS

| | | | | |
|---|---|---|---|---|
| 2,500,273 | A * | 3/1950 | Breth | B29D 30/28 |
| | | | | 156/421 |
| 3,251,722 | A * | 5/1966 | Holman | 156/130 |
| 4,276,105 | A | 6/1981 | Gessaga | |
| 4,306,931 | A | 12/1981 | Klose | |
| 4,371,410 | A | 2/1983 | Stevens | |
| 4,963,207 | A * | 10/1990 | Laurent | 156/117 |
| 5,007,343 | A * | 4/1991 | Marks | 102/290 |
| 5,169,483 | A | 12/1992 | Tokunaga et al. | |
| 5,264,066 | A * | 11/1993 | Lundell | 156/361 |
| 6,957,677 | B2 | 10/2005 | Martin et al. | |
| 2002/0053389 | A1 | 5/2002 | Martin et al. | |
| 2004/0055711 | A1* | 3/2004 | Martin et al. | 156/397 |
| 2004/0066083 | A1* | 4/2004 | Tsihlas | 301/6.91 |
| 2008/0011409 | A1* | 1/2008 | Ogawa | 156/117 |
| 2009/0065124 | A1* | 3/2009 | Culzoni | 156/153 |
| 2009/0188607 | A1 | 7/2009 | Tatara et al. | |

FOREIGN PATENT DOCUMENTS

| | | |
|---|---|---|
| EP | 1 375 118 A1 | 1/2004 |
| EP | 1 754 592 A1 | 2/2007 |
| JP | 11-129347 * | 5/1999 ............ B29D 30/30 |
| JP | 2003-34109 * | 2/2003 ............... B60C 9/20 |
| JP | 2004-216603 | 8/2004 |
| JP | 2007-223223 * | 9/2007 ............ B29D 30/26 |
| WO | WO 2008/018120 | 2/2008 |
| WO | WO 2009/040594 A1 | 4/2009 |

OTHER PUBLICATIONS

Machine generated English language translation of JP 2007-223223 (original document dated Sep. 2007).*
Machine generated English language translation of JP 2003-34109 (original document dated Feb. 2003).*
International Search Report from the European Patent Office for International Application No. PCT/IB2010/052659, mailing date Aug. 20, 2010.
Communication Pursuant to Article 94(3) EPC mailed Oct. 24, 2013 by the European Patent Office in corresponding Application No. 10 728 372.3 (5 pages).
Notification of the First Office Action issued Dec. 27, 2013, by the State Intellectual Property Office of the People's Republic of China in corresponding Application No. CN 201080031335.X (9 pages).
English-language translation of Notification of the First Office Action issued Dec. 27, 2013, by the State Intellectual Property Office of the People's Republic of China in corresponding Application No. CN 201080031335.X (9 pages).

* cited by examiner

PROCESS AND APPARATUS FOR BUILDING TIRES FOR VEHICLE WHEELS

CROSS REFERENCE TO RELATED APPLICATIONS

This application is a national phase application based on PCT/IB2010/052659, filed Jun. 15, 2010, which claims the priority of Italian Application No. MI2009A001238, filed Jul. 13, 2009, and the benefit of U.S. Provisional Application No. 61/213,848, filed Jul. 21, 2009, the content of all of which is incorporated herein by reference.

BACKGROUND OF THE INVENTION

1. Field of the Invention

The present invention relates to a process and an apparatus for building tires for vehicle wheels.

2. Description of the Related Art

A tire for vehicle wheels generally comprises a carcass structure including at least one carcass ply having respectively opposite end flaps in engagement with respective annular anchoring structures, integrated into the regions usually identified as "beads".

Associated with the carcass structure is a belt structure comprising one or more belt layers, located in radially superposed relationship with each other and with the carcass ply and provided with textile or metallic reinforcing cords having a crossed orientation and/or being substantially parallel to the circumferential extension direction of the tire.

A tread band is applied at a radially external position to the belt structure, which tread band is made of elastomeric material like other semifinished products constituting the tire.

Respective sidewalls of elastomeric material are further applied at an axially external position to the side surfaces of the carcass structure, each extending from one of the side edges of the tread band until close to the respective annular anchoring structure to the beads.

After building of the green tire by assembly of respective semifinished products, a vulcanization and molding treatment is generally carried out, which aims at determining the structural stabilization of the tire by cross-linking of the elastomeric compounds and also at impressing the tread band, wound up around the carcass before vulcanization, with a desired tread pattern and the region close to the tire sidewalls with possible distinctive graphic marks.

Within the present description and in the following claims, by "elastomeric material" it is intended a composition including at least one elastomeric polymer and at least one reinforcing filler. Preferably, this composition further comprises additives such as cross-linking agents and/or plasticizers. Due to the presence of the cross-linking agents, this material can be cross-linked by heating, so as to form the final article of manufacture.

Document WO 2009/040534 in the name of the same Applicant, discloses a process for manufacturing tires for vehicle wheels, which process comprises the steps of: building the carcass structure of a green tire on a first forming drum in at least one carcass-building line, building a crown structure on a second forming drum in at least one crown-building line, shaping the carcass structure into a toroidal conformation, while it is being assembled to the crown structure in at least one assembly and shaping station. The assembly and shaping station is synchronized with the carcass-building line and the crown-building line. Each carcass structure is associated with the respective first forming drum on which it is built up to the end of the assembly and shaping step. The above mentioned stations are operatively associated with units adapted to supply elementary semi-finished products, such as continuous elongated elements of elastomeric material, strips of elastomeric material containing two or more textile or metallic cords, individual textile or metallic of coated with elastomeric material. Once the careen tire has been built, it is cured and molded in at least one vulcanization and molding line separated from the building line. In the above described work stations, said elementary semi-finished products can be wound up into coils disposed in side by side relationship and/or at least partly superposed, such as in the case of the continuous elongated elements for example, contributing to formation of the liner, under-liner, under-layers, fillers present in the regions of the beads, sidewalls, tread band.

In this regard, document EP 1 375 118 discloses a green tire, or a tire component, that is manufactured by winding into coils and rolling a rubber strip on a building drum. To this aim, a building device comprises a rigid support or building drum, on which the rubber strip is wound into coils and rolled, an extruder adapted to extrude the rubber strip, a winder for winding the rubber strip on the rigid support, and a flattening roller, adapted to flatten the projection of a step portion produced by a first part of the rubber strip and a second part of the same rubber strip overlapping the first one. Flattening prevents the residual air from remaining entrapped during vulcanization, in the regions close to the step portions between the outer surface of the tire component and the vulcanization mold and avoids the consequent presence of hollows and slits in the finished tire. The surface of the flattening roller is provided with a knurl. The step of spirally winding and rolling the rubber strip and the flattening step can be carried out simultaneously.

Document EP 1 754 592 discloses a method of building a tire, said method allowing elimination of the residual air between the step portions of an overlapped portion of a tire component and the vulcanization mold, so as to avoid formation of hollows, slits, etc. causing a reduction in the tire lifetime. The method comprises the steps of flattening a step formed at an overlapped portion of a tire component and optimizing the cross-section shape of said overlapped portion. The apparatus used for putting this method into practice comprises a building platform, an extruder for extrusion of a rubber strip and a pressure roller. A component of the tire is formed by spirally winding the rubber ribbon-like strip, extruded through the extruder, on the building platform and forming an overlapped portion of this rubber strip. A step of this overlapped portion that is exposed on the outer surface of the tire component is flattened under pressure through the pressure roller that is such disposed as to face the building platform by a specific angle relative to the extension direction of the rubber strip and is heated to the plasticization temperature in order to make the outer tire surface smooth.

SUMMARY OF THE INVENTION

The Applicant has noticed that, in addition to the air entrapped between the steps defined by the rubber strip and the cavity of the vulcanization mold, as described in documents EP 1 754 592 and EP 1 375 118 mentioned above, also air pockets or more generally gas pockets are formed under the continuous elongated element of elastomeric material already during laying of said element into at least partly superposed coils. During vulcanization, since the radially outermost (tread band) and radially innermost (the liner, for example) surface layers that are cured the first acquire imperviousness features, the air contained in these pockets remains entrapped therein or moves to the outer surface but does not escape therefrom, thus forming surface bubbles.

The Applicant has further noticed that the higher the laying temperature of the continuous elongated element is, the more important the just described phenomenon concerning formation of air pockets is, and that said temperature increases on increasing of the laying speed, or on decreasing of the time intervening between ejection of the compound of the continuous elongated element from the extruder and application of said element into coils on the respective forming drum.

The Applicant has therefore ascertained that this phenomenon is particularly significant in the processes for manufacturing tires for vehicle wheels like that described in the above mentioned document WO 2009/040594 in which the individual floor to floor times necessary for building the different tire portions such as the crown structure (belt structure and tread band) and carcass structure must be reduced to the minimum for obtaining high production rates.

The Applicant has perceived that by exerting pressure in a differentiated manner on the elongated element just laid, the air possibly entrapped between portions of the elongated element at least partly overlapping each other can escape easily and in a more efficient manner, avoiding the persistent presence of air pockets that can generate the above mentioned drawbacks.

The Applicant has finally found that, by exerting pressure on a central region of a portion of the continuous elongated element immediately after laying of same and by subsequently exerting pressure on the side regions of the same portion, it is possible to discharge the air possibly entrapped under said continuous elongated element and therefore avoid said air forming pockets and bubbles that would remain entrapped in the cured and molded tire.

More specifically, in a first aspect, the present invention relates to a process for building tires for vehicle wheels comprising the step of: assembling components of elastomeric material on a forming support, in which at least one of said components of elastomeric material is made by the steps of:

i) dispensing a continuous elongated element of elastomeric material;

ii) applying the continuous elongated element in the form of coils disposed in side by side relationship or at least partly superposed, wound up on the forming support in order to form said at least one tire component of elastomeric material;

iii) exerting a first pressure on a central region of a portion of the continuous elongated element applied onto the forming support;

iv) exerting a second pressure on side regions of said portion of the continuous elongated element applied onto the forming support.

It is the Applicant's opinion that the first pressure directs its force against the continuous elongated element squashing and pressing it in the middle, laterally moving the possible air bubbles entrapped thereby, while the second pressure spreads and smoothes the continuous elongated element on its sides forcing said air bubbles to the outside.

In accordance with a second aspect, the present invention relates to a tire for vehicle wheels built following the process as described and/or claimed.

In a third aspect, the present invention relates to an apparatus for building tires for vehicle wheels comprising: at least one forming support; at least one assembly device for assembling components of elastomeric material on the forming support; wherein said at least one assembly device comprises: at least one dispensing device for dispensing a continuous elongated element of elastomeric material; at least one application device for applying said continuous elongated element in the form of coils disposed in side by side relationship or at least partly superposed, wound up on the forming support, and forming said at least one component of elastomeric material of the tire; at least one pressure device operatively acting on an applied portion of the continuous elongated element; wherein the pressure device comprises a central roller and two side rollers, each laterally offset relative to the central roller and on the opposite side relative to the other side roller.

The present invention, in at least one of the above aspects can have one or more of the preferred features as hereinafter described.

Preferably step iv) follows step iii).

In this way, the pressure exerted on the central region moves possible air bubbles from the center to the sides of the continuous elongated element while, subsequently, pressures exerted on the side regions cause escape of the entrapped air from the side edges.

Preferably, between step ii) and step iii) a first time interval intervenes which is included between about 0 s and about 1 s.

In addition, preferably, between step iii) and step iv) a second time interval intervenes which is included between about 0 s and about 1 s.

The shorter the time intervening between distribution, application and compression of the continuous elongated element is, the greater the temperature and plasticity of the elastomeric material during the compression steps, and consequently the greater the ease with which the compound is deformed and molded.

In addition, preferably, during steps iii) and iv), said portion has an average temperature included between about 90° C. and about 110° C.

In a preferred alternative embodiment, along a direction orthogonal to the longitudinal extension of the continuous elongated element, the side regions are partly superposed on the central region according to a superposition width.

Preferably said superposition width is included between about 0.5 mm and about 5 mm.

Said superpositions ensure that pressure is exerted over the whole surface of the continuous elongated element so as to eliminate the persistent presence of underlying air bubbles.

In a preferred alternative embodiment of the process, during step iv) the second pressure is exerted on at least one side edge of the continuous elongated element.

In addition, preferably, during step iv), said at least one side edge is submitted to a hammering action.

By "hammering" it is intended application of micro-hits on the surface of the continuous elongated element, carried out by means of at least one roller for example, which is provided with a side work surface having raised elements and/or grooves (knurling), Pressure exerted on the edge and hammering have a visual effect on the outer and visible components of the tire such as the tread band and sidewalls for example, because they squash the continuous elongated element wound into coils and create microfractures therein, so that the separation lines between adjacent coils become less visible also after vulcanization.

Preferably, step ii) is carried out at a linear application speed of the continuous elongated element included between about 0.1 m/s and about 2 m/s.

Compression of the continuous elongated element after application of same takes a fundamental importance for high application speeds, as those stated above, that are necessary for obtaining high production volumes. In fact, corresponding to the high speeds are high laying temperature to which the phenomena of air expansion and bubble generation are more important and frequent.

In a preferred alternative embodiment of the apparatus, the central roller has a rotation axis distinct from a rotation axis of the side rollers.

Preferably, along an application direction, the central roller is interposed between the application device and the two side rollers.

This structure allows pressure to be first exerted in the middle and subsequently on the side regions of the continuous elongated element.

Preferably, along an application direction, a first distance between the application device and the central roller is included between about 20 mm and about 200 mm.

Preferably, along an application direction, a second distance between the central roller and the two side rollers is included between about 10 mm and about 100 mm.

Since the application device too preferably comprises an applicator roller, these distances are intended measured between the contact points of the applicator roller and the rollers of the pressure device with the continuous elongated element applied onto the forming support.

Said distances must preferably be maintained within the stated limits for two reasons.

First of all, for compressing the continuous element when the compound is still very hot (the smaller the distance is, the shorter the time intervening between application and compression), for the already highlighted reasons; and in addition, for limiting a misalignment between the center line of the application device and the center line of the pressure device. In fact the continuous elongated element is spirally wound on the forming support according to a determined spiraling angle, measured between a longitudinal extension direction of the continuous elongated element and a plane orthogonal to the rotation axis of the forming support. Misalignment between the center line of the application device and the center line of the pressure device and, as regards the individual pressure device, misalignment between the center line of the central roller and the center line of the side rollers allow the just laid portion of the continuous elongated element to be correctly compressed. These misalignments that should be set at each laying cycle with suitable adjustment mechanisms based on the concerned geometries and speeds, can be neglected if the above mentioned distances are of rather small value.

According to a preferred embodiment, a peripheral work surface of the central roller at least partly faces at least one of the peripheral work surfaces of the side rollers.

Preferably, along a direction parallel to rotation axes of the central roller and side rollers, the peripheral work surface of the central roller has a superposition width with said at least one of the peripheral work surfaces of the side rollers included between about 0.5 mm and about 5 mm.

The relative position between the rollers ensures that the whole surface of the continuous elongated element is submitted to pressure.

According to a preferred embodiment, the central roller and each of the side rollers are movable irrespective of each other along a direction substantially orthogonal to the forming support.

Preferably, the pressure device comprises spring elements operatively associated with the central roller and the two side rollers, to maintain said rollers into contact with said portion of the continuous elongated element.

In addition, preferably, each of the spring elements is associated with one of the rollers in a manner independent of the others.

In addition, preferably, the spring elements are pneumatic cylinders.

Contact between each of the rollers and the continuous elongated element is ensured under any laying condition and for every speed and laying angle.

According to a preferred embodiment, the pressure device comprises: a supporting frame and a central small arm having a central portion thereof hinged thereon.

Preferably said central small arm carries the central roller on a first end thereof.

Preferably the pressure device further comprises a first spring element mounted on the supporting frame and secured to a second end of the central small arm.

More preferably, said pressure device comprises two side small arms positioned on opposite sides of the central small arm, each having a central portion thereof hinged on the supporting frame and carrying one of the side rollers on a first end thereof.

In a further preferred alternative solution, said pressure device comprises two second spring elements, each mounted on the supporting frame and secured to a second end of a respective side small arm.

The specific structure adopted is of simple and cheap structure and at the same time stiff and reliable, so as to ensure a correct and precise laying and pressing of the continuous elongated element.

According to a preferred embodiment, the assembly device comprises a head supporting the application device and pressure device.

Alignment between the application device and pressure device is ensured by the fact that they are mounted as a single assembly.

Preferably, the central roller has a peripheral contact edge having a radius of curvature in diametrical section that is included between about 0.5 mm and about 3 mm.

Preferably, each of the two side rollers has a peripheral contact edge having a radius of curvature in diametrical section included between about 0.5 mm and about 3 mm.

In addition, preferably, the diametrical section of each of the two side rollers is asymmetric and said peripheral contact edge is the external one.

Said radius of curvature and the position of the peripheral edge are such selected as to exert a predetermined pressure at a predetermined point of the continuous elongated element.

Preferably, a peripheral work surface of the central roller has a width included between about 3 mm and about 10 mm.

Preferably, a peripheral work surface of each of the side rollers has a width included between about 3 mm and about 10 mm.

Preferably, the side rollers have a minimum distance from each other included between about 3 mm and about 10 mm.

Preferably, the central roller has a maximum diameter included between about 20 mm and about 80 mm.

Preferably, each of the side rollers has a maximum diameter included between about 20 mm and about 80 mm.

The geometry and sizes of the rollers enable compression of the whole surface of the continuous elongated element to be compressed and also the steps defined by the superposed adjacent coils to be flattened, thus helping in eliminating the traces of the elongated element on the tread band and/or the sidewalls of the cured and molded tire.

Also helping in this second function is a peripheral work surface of the central roller and of each of the side rollers having raised elements for exerting a hammering action on the portion of the continuous elongated element.

Further features and advantages will become more apparent from the detailed description of a preferred but not exclusive embodiment of an apparatus for building tires for vehicle wheels in accordance with the present invention.

BRIEF DESCRIPTION OF THE DRAWINGS

This description will be set out hereinafter with reference to the accompanying drawings, given by way of non-limiting example, in which.

DETAILED DESCRIPTION OF THE INVENTION

Figure 1:
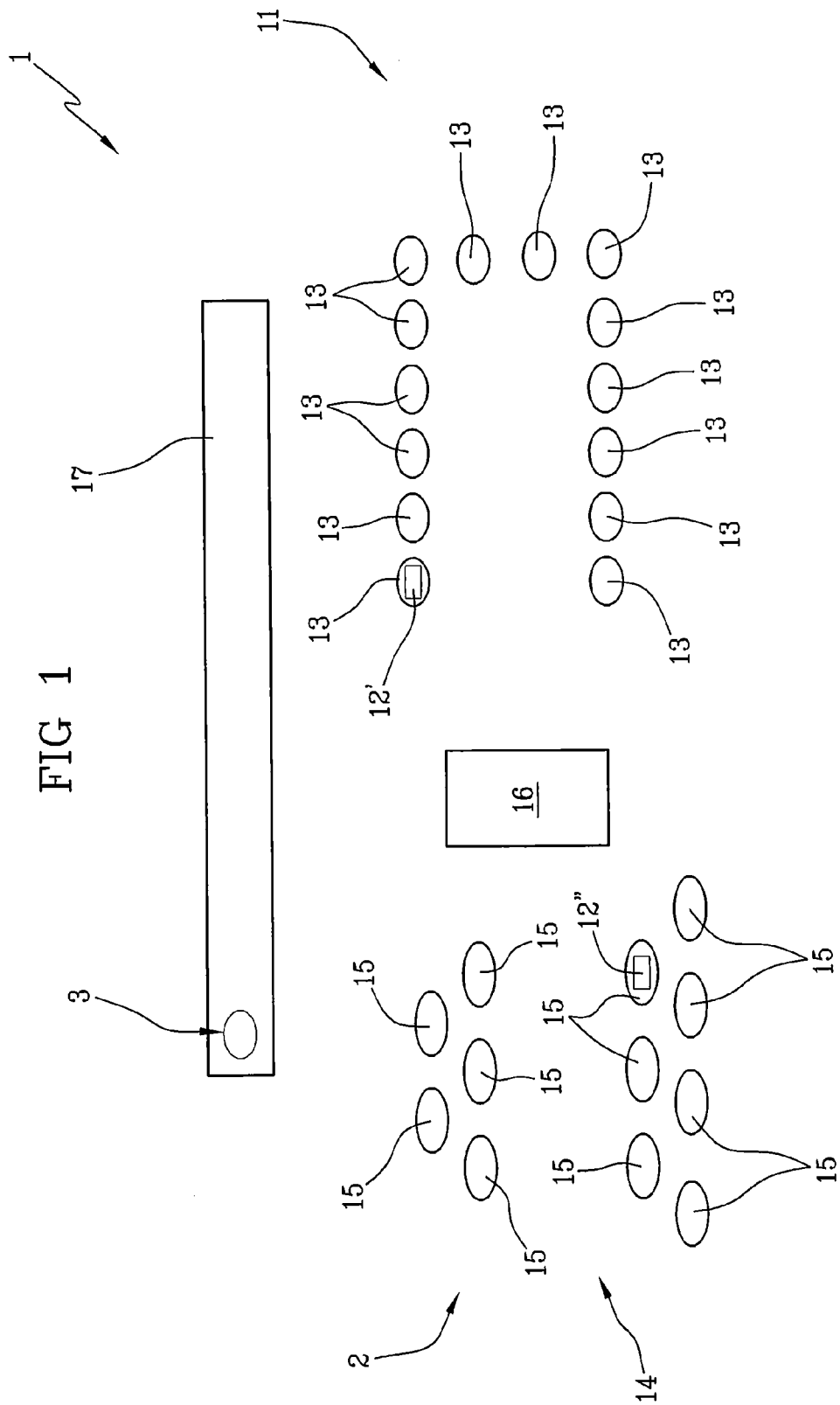
FIG. 1 is a diagrammatic top view of a plant for tire production comprising an apparatus for building tires in accordance with the present invention.

With reference to the drawings, a plant for tire production comprising an apparatus 2 for building tires in accordance with the present invention has been generally identified with reference numeral 1.

Figure 6:
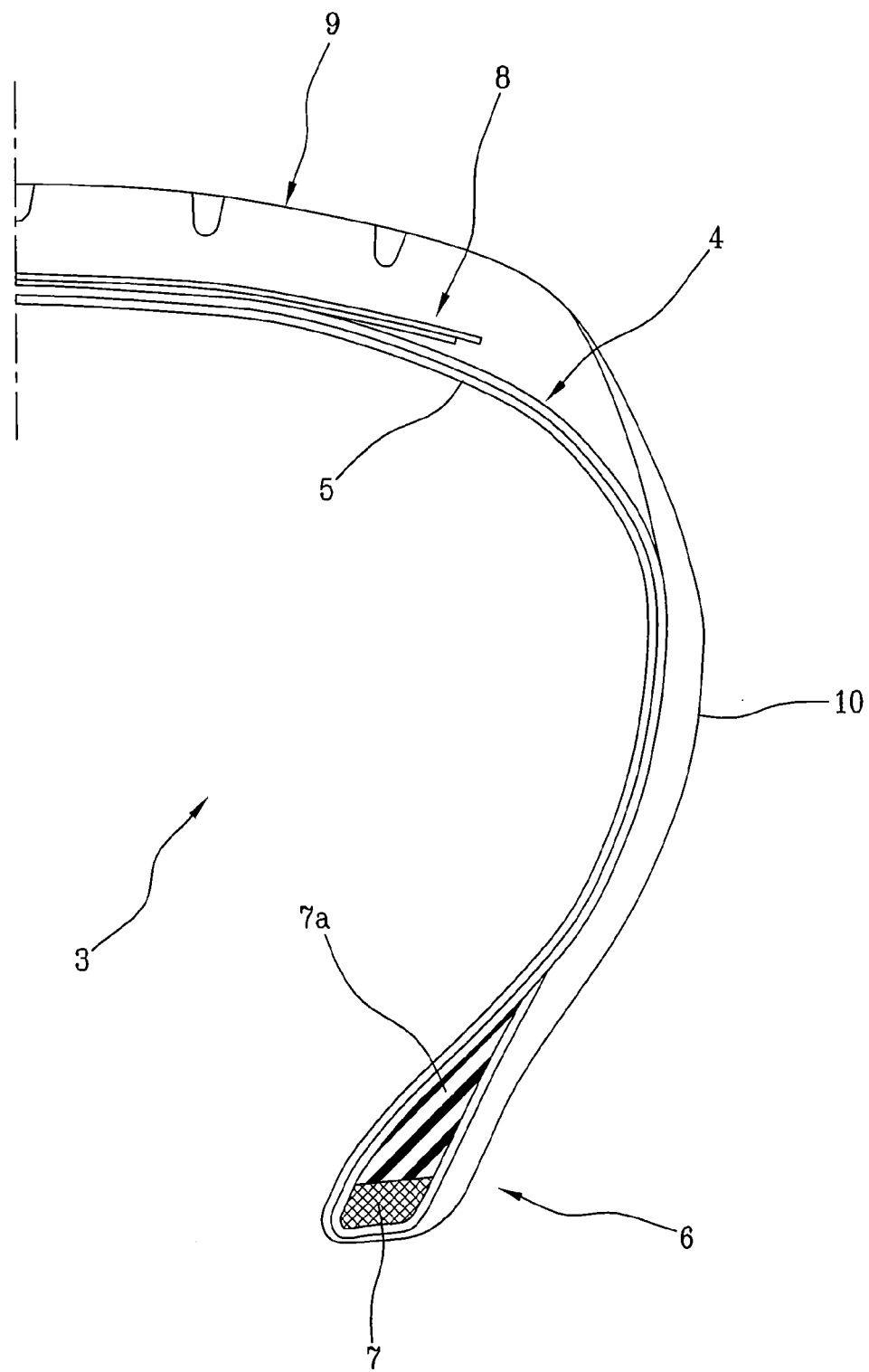
FIG. 6 is a diagrammatic diametrical section of a tire for vehicle wheels obtained with the plant seen in FIG. 1.

Plant 1 is intended for manufacturing tires 3 (FIG. 6) essentially comprising at least one carcass ply 4 preferably internally coated with a layer of airtight elastomeric material or a so-called "liner", two so-called "beads" 6 integrating respective annular anchoring structures 7 possibly associated with elastomeric fillers 7a and in engagement with the circumferential edges of the carcass ply 4, a belt structure 8 applied to the carcass ply 4 at a radially external position, a tread band 9 applied to the belt structure 8 at a radially external position, in a so-called crown region of the tire 3, and two sidewalls 10 applied to the carcass ply 4 at laterally opposite positions, each at a side region of the tire 3, extending from the corresponding bead 6 to the corresponding side edge of the tread band 9.

Apparatus 2 for building tires preferably comprises a line for building carcass structures 11, in which a carcass structure comprising at least one of the carcass plies 4 and the annular anchoring structures 7 is formed on a first forming drum 12'. Denoted in FIG. 1 are a plurality of work stations 13 belonging to said line 11 for building carcass structures and each dedicated to formation and/or application of a component of elastomeric material of tire 3 on the first forming drum 12'. The first forming drum 12' is sequentially transferred from one station to the following one, by means of robotized arms, not shown, or other suitable devices.

By way of example, in a first station 13 liner 5 is made through winding of a continuous elongated element of elastomeric material into coils disposed mutually in side by side relationship and/or at least partly superposed and distributed along the forming surface of the first forming drum 12'. In at least one second station 13 manufacture of one or more carcass plies 4 can be carried out, which carcass plies are obtained by laying strip-like elements on the first forming drum 12', in circumferentially approached relationship, said strip-like elements being formed by cutting to size a continuous strip of elastomeric material comprising textile or metallic cords disposed parallel in side by side relationship. A third building station 13 can be dedicated to integration of the annular anchoring structures 7 with said at least one carcass ply 4, through application of said annular anchoring structures 7 at an axially external position to the flaps of said at least one carcass ply 4 knocked down in the direction of the rotation axis of said first forming drum 12', which flaps will be subsequently turned up around the annular anchoring structures 7.

Apparatus 2 for building tires further comprises a line for building crown structures 14, in which a crown structure comprising at least the belt structure 8 and tread band 9 is formed on a second forming drum 12". Denoted in FIG. 1 is a plurality of work stations belonging to said line 14 for building crown structures and each dedicated to forming and/or applying a component of elastomeric material of tire 3 on the second forming drum 12". The second forming drum 12" is sequentially transferred from one station to the subsequent one, by means of robotized arms, not shown, or other suitable devices.

At least one building station 15 can be dedicated to manufacture of the annular belt structure 8 obtained by laying strip-like elements in circumferentially approached relationship, which strip-like elements are obtained by cutting to size a continuous strip of elastomeric material comprising preferably metallic mutually parallel cords, and/or by winding a textile or metallic rubberized reinforcing cord into axially approached coils, in the crown portion of tire 3. By way of example, a work station 15 can be intended for manufacture of the tread band 9 or sidewalls 10. Tread band 9 and sidewalls 10 are preferably obtained by winding of at least one continuous elongated element of elastomeric material into mutually approached and/or at least partly superposed coils.

Apparatus 2 is further provided with an assembly and conformation station 16 operatively associated with line 11 for building carcass structures and line 14 for building crown structures. In the assembly and conformation station 16 the carcass structure is shaped and associated with the crown structure, so as to obtain a green tire.

Tires built by apparatus 2 are sequentially transferred to a vulcanization unit line 17 integrated into plant 1 from which cured and molded tires 3 are obtained.

Figure 2:
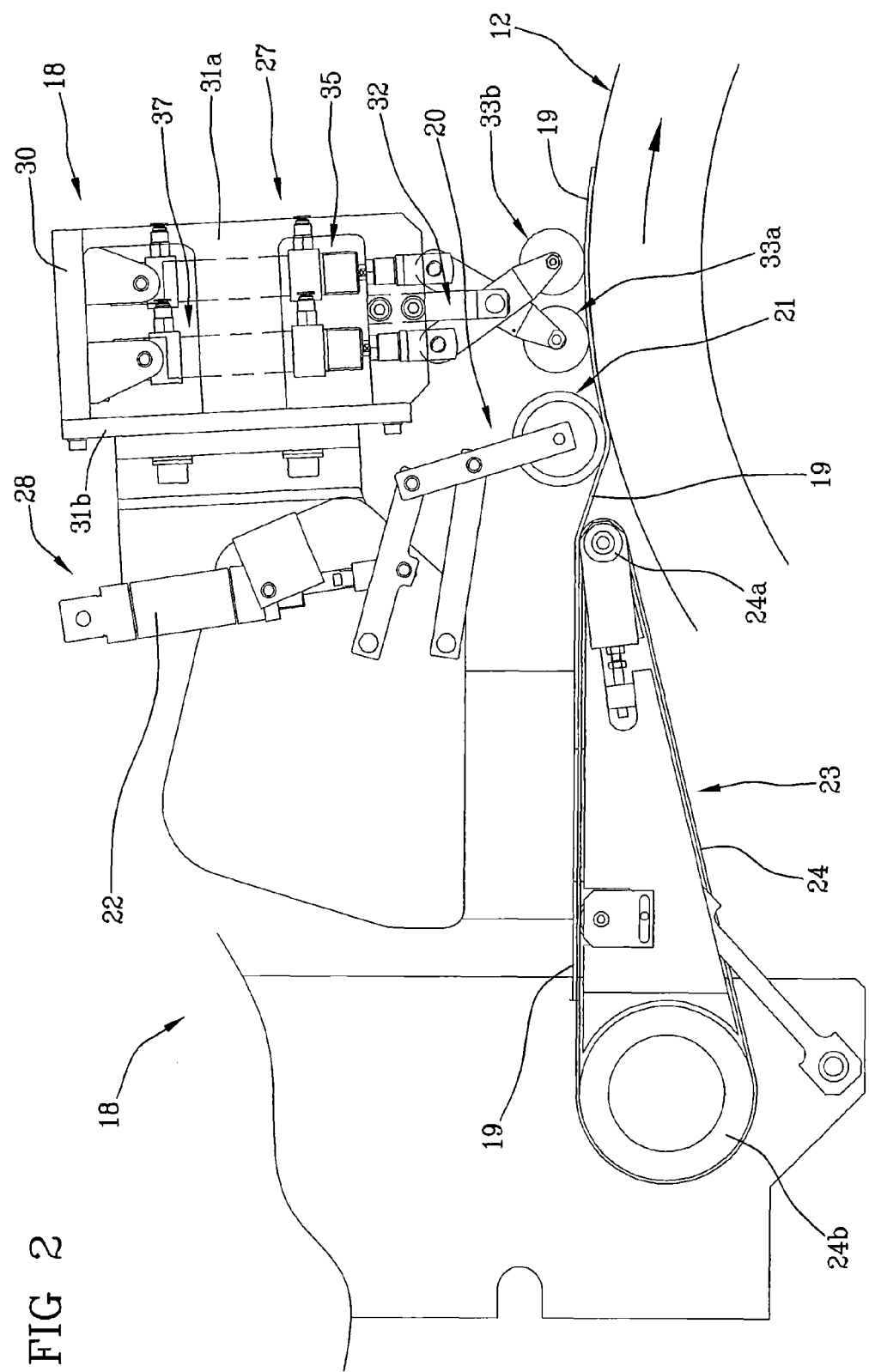
FIG. 2 is a diagrammatic side view of an assembly device being part of the apparatus in question and comprising a pressure device in accordance with the present invention.

As mentioned above, in accordance with the present invention, at least one of the components of only elastomeric material of tire 3, such as liner 5, fillers 7a and/or other parts of elastomeric material of beads 6, sidewalls 10, tread band 9, underliner, underbelt layer, underlayer of the tread band, abrasion-proof elements and/or others, is obtained by an assembly device denoted as a whole at 18 (FIG. 2).

The assembly device 18 comprises a dispensing device in the preferred form of an extruder (not shown), producing a continuous elongated element 19 of elastomeric material. The extruder is provided with a cylinder into which elastomeric material is introduced. The cylinder heated to a controlled temperature, just as an indication included between about 60° C. and about 100° C., operatively houses a rotating screw, by effect of which the elastomeric material is pushed along said cylinder to an outlet orifice of the extruder.

Through the outlet orifice, the continuous elongated element 19 is dispensed at a desired linear speed, corresponding to a so-called "target value" of the volumetric flow rate, just as an indication included between about 10 $cm^3$/s and about 60 $cm^3$/s, and at a temperature just as an indication included between about 90° C. and about 110° C.

An application device 20, operating downstream of the extruder, carries out application of the continuous elongated element 19 coming from the extruder, onto a forming support 12. The forming support 12 can be said first forming drum 12' or said second forming drum 12".

During application, the forming support 12, supported in overhanging by one of said robotized arms for example, is driven in rotation and suitably moved in front of the application device 20 for distributing the continuous elongated element 19 into approached and/or at least partly superposed coils, wound around such a forming support 12, so as to form liner 5 for example, or any other component of elastomeric material of the tire being processed.

The application device 20 comprises (FIG. 2) at least one roller or other applicator member 21 acting in thrust relationship towards the forming support 12, for instance by effect of a pneumatic actuator 22, for applying the continuous elongated element 19 onto the forming support 12 itself.

Operatively interposed between the extruder and the application device 20 is a conveyor 23, the function of which consists in bringing the continuous elongated element 19 coming out of the extruder onto the forming support 12 and until the application device 20.

In the preferred embodiment herein illustrated, the conveyor 23 comprises a conveyor belt 24 defined by a cogged rubber belt or a metal belt, passing over rollers 24a, 24b. The conveyor belt 24 on the upper part has a forward stretch supporting the elongated element 19.

The continuous elongated element 19 coming out of the conveyor belt 24 at the end roller 24a is continuously laid on support 12 by the applicator roller 21. In particular, the applicator roller 21 presses the continuous elongated element 19 sliding under and against it, against the forming support 12 for determining adhesion of same. The applicator roller 21 therefore rotates in the opposite direction relative to rotation of the forming support 12.

Downstream of the applicator member 21 there is a pressure device 27 which is preferably mounted on a head 28 also carrying the application device 20. The applicator member 21 and pressure device 27 are further operatively supported relative to conveyor 23. The head 28 is in fact mounted on a structure holding the conveyor 23.

The pressure device 27, better shown in FIGS. 3, 4a, 4b and 5, comprises a substantially box-shaped supporting frame 29 formed with an upper wall 30 and a pair of side walls 31a defining an inverted-U shape. A bottom wall 31b connects the two side walls 31a and is secured to head 28.

Respective fixed arms are secured to lower portions of the side walls 31a, which arms each have a first end 32a integral with the supporting frame 29 and a second end 32b. The second ends 32b of the two fixed arms 32 face each other for supporting a central roller 33a and two side rollers 33b, as described in detail in the following.

In particular, a central small arm 34 is hinged, at a central portion thereof, on the second ends 32b of the fixed arms 32 around a first articulation axis "X-X". A first end 34a of the central small arm 34 has a fork rotatably carrying the central roller 33a. E second end 34b of the central small arm 34, opposite to the first one 34a, is hinged on a spring element 35 in turn mounted on the supporting frame 29. Preferably, as in the embodiment shown, the spring element 35 is a pneumatic cylinder. An end of the pneumatic cylinder 35, belonging to the rod 35a of the cylinder 35 itself is hinged on said central small arm 34 around a second articulation axis "Y-Y" and an opposite end, belonging to the body 35b of the cylinder 35, is hinged on a bracket integral with the upper wall 30 of the supporting frame 29.

Two side small arms 36 are positioned on opposite sides of the central small arm 34. The lateral small arms 36 are parallel to each other and cross the central small arm 34. Each of the lateral small arms 36 has a central portion thereof hinged on the second ends 32b of the fixed arms 32 and on the central small arm 34 around the first articulation axis "X-X". A first end 36a of each of the lateral small arms 36 rotatably carries one of the side rollers 33b. A second end 36b of each of the lateral small arms 36, opposite to the first one 36a, is hinged on a respective spring element 37 in turn mounted on the supporting frame 29.

Preferably, as in the embodiment shown, each of the two spring elements 37 is a pneumatic cylinder an end of each of the pneumatic cylinders 37 belonging to the rod 37a of cylinder 37, is hinged on the respective lateral small arm 36 around a third articulation axis "Z-Z" and an opposite end, belonging to the body 37b of the cylinder 37, is hinged on a bracket integral with the upper wall 30 of the supporting frame 29. Each of the pneumatic cylinders 37 is associated with one of rollers 33b in a manner independent of the others.

The central roller 33a, two side rollers 33b and the applicator roller 21 have rotation axes that are substantially parallel to each other. The central roller 33a is substantially aligned with the applicator roller 21 along a trajectory or application direction of the continuous elongated element on the forming support 12. The two side rollers 33b are coaxial to each other and offset towards opposite sides of the central roller 33a (FIGS. 5 and 5a).

Figure 3:
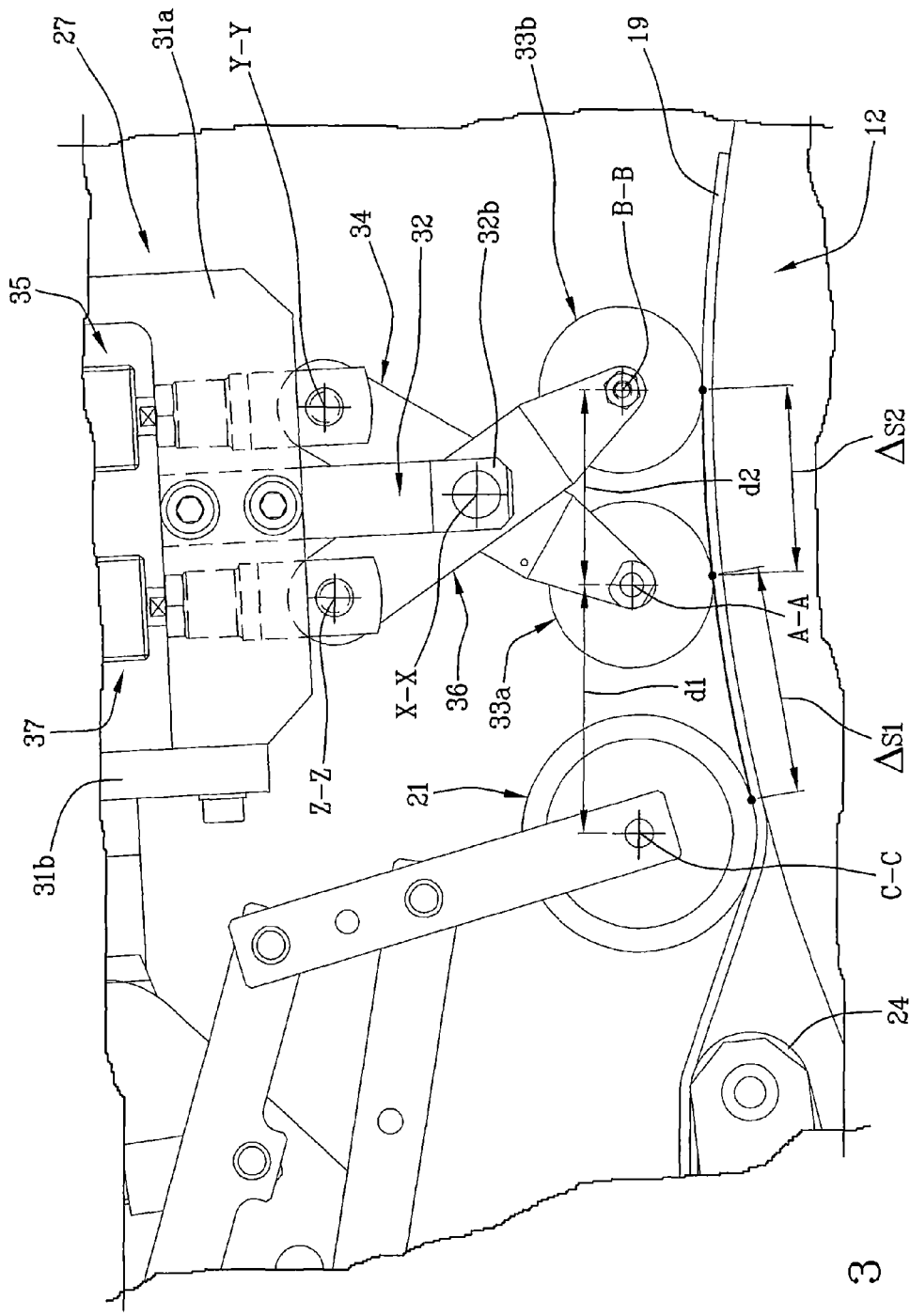
FIG. 3 shows an enlarged portion of the assembly device seen in FIG. 2.
Figure 4A:
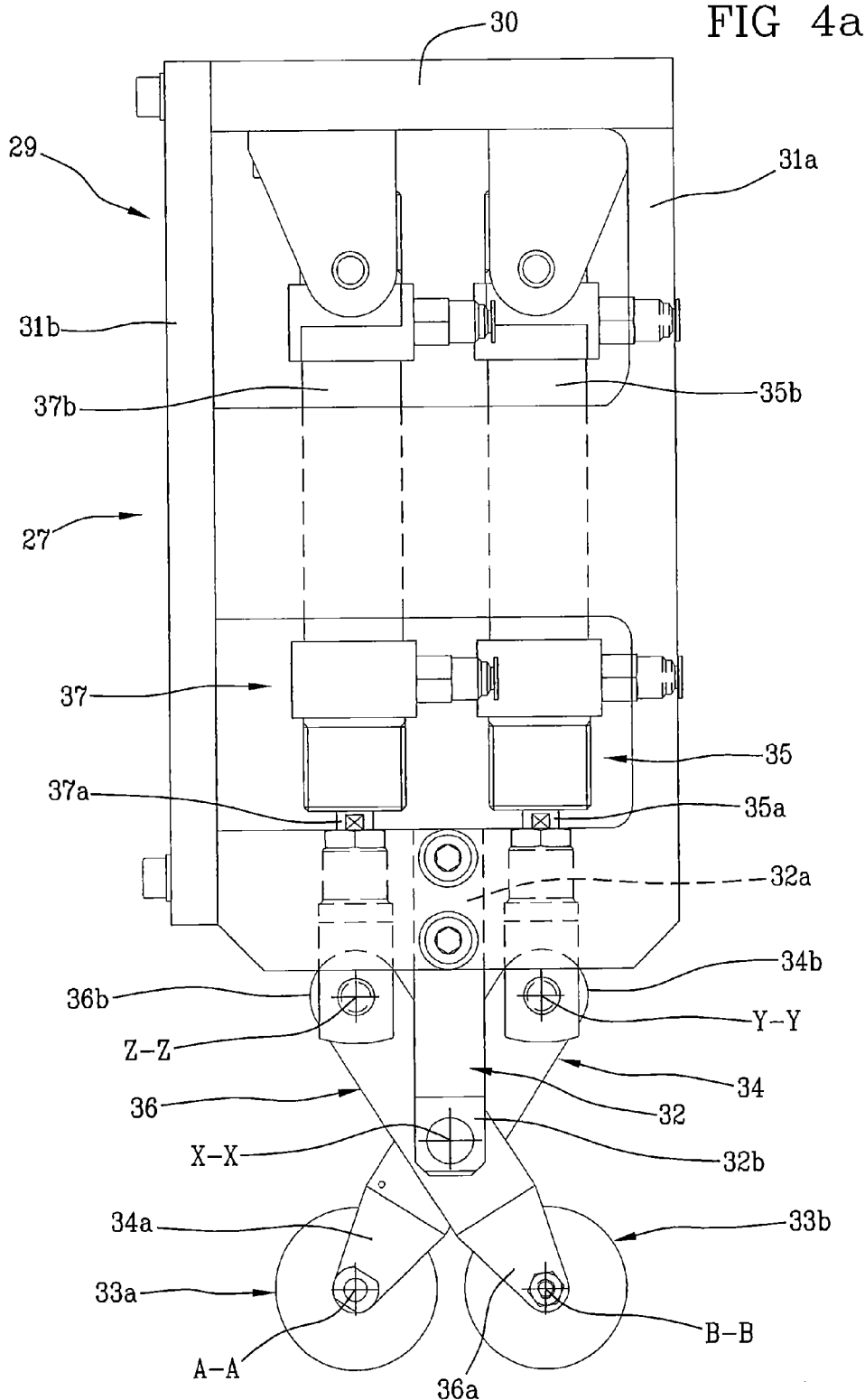
FIG. 4a is a side view of the pressure device seen in FIG. 2.
Figure 4B:
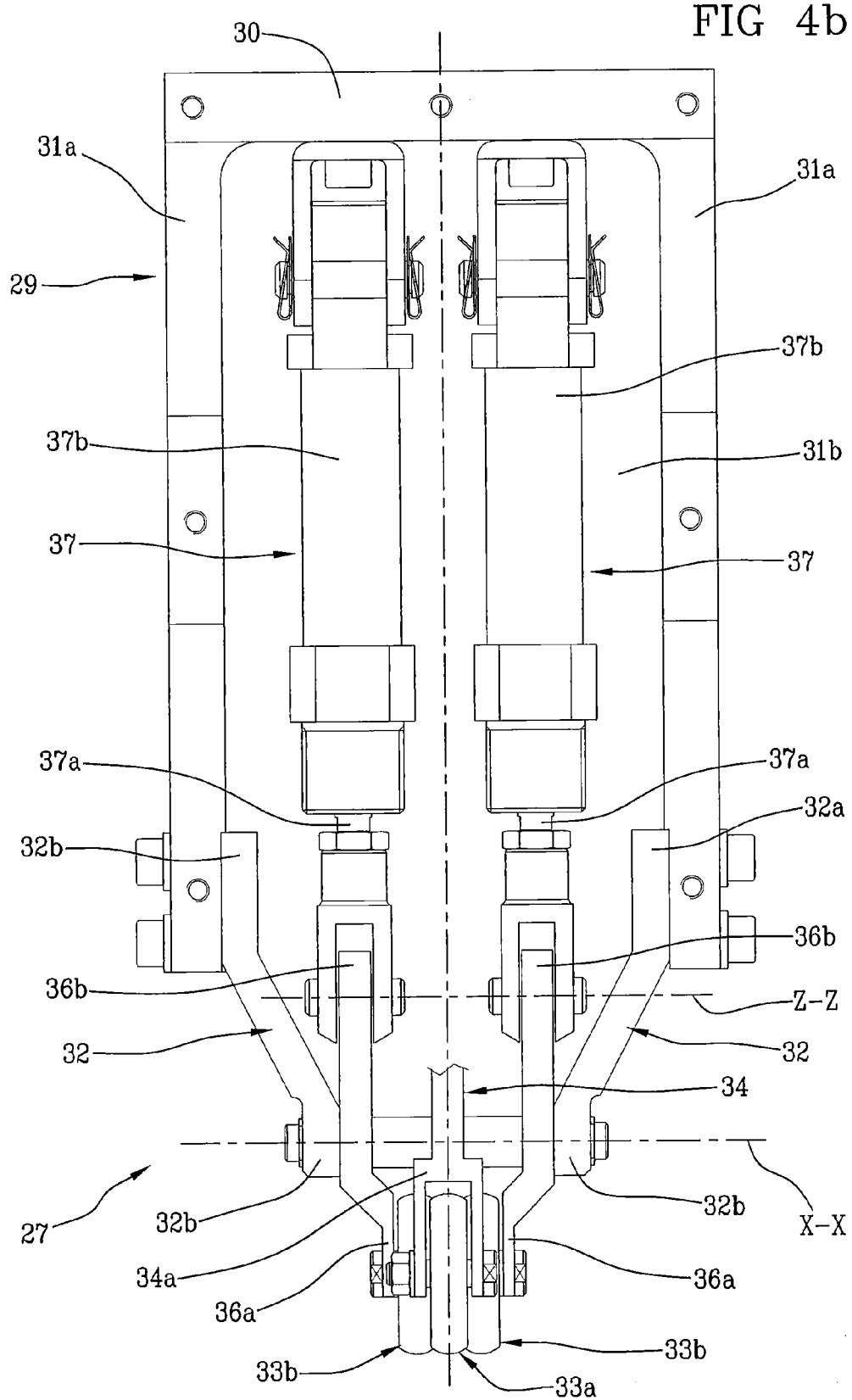
FIG. 4b is a front view of the pressure device seen in FIG. 2.

The central roller 33a has a rotation axis "A-A" distinct from the rotation axis "B-B" of the side rollers 33b and the rotation axis "C-C" of the applicator roller 21. In particular, along said application direction, the central roller 33a remains positioned between the applicator roller 21 and the two side rollers 33b (FIG. 3).

The central roller 33a has (FIG. 5a) a maximum diameter "Da", intended as the diameter of the radially outermost portion, included between about 20 mm and about 80 mm. Each of the side rollers 33b has a maximum diameter "Db" included between about 20 mm and about 80 mm.

Figure 5:
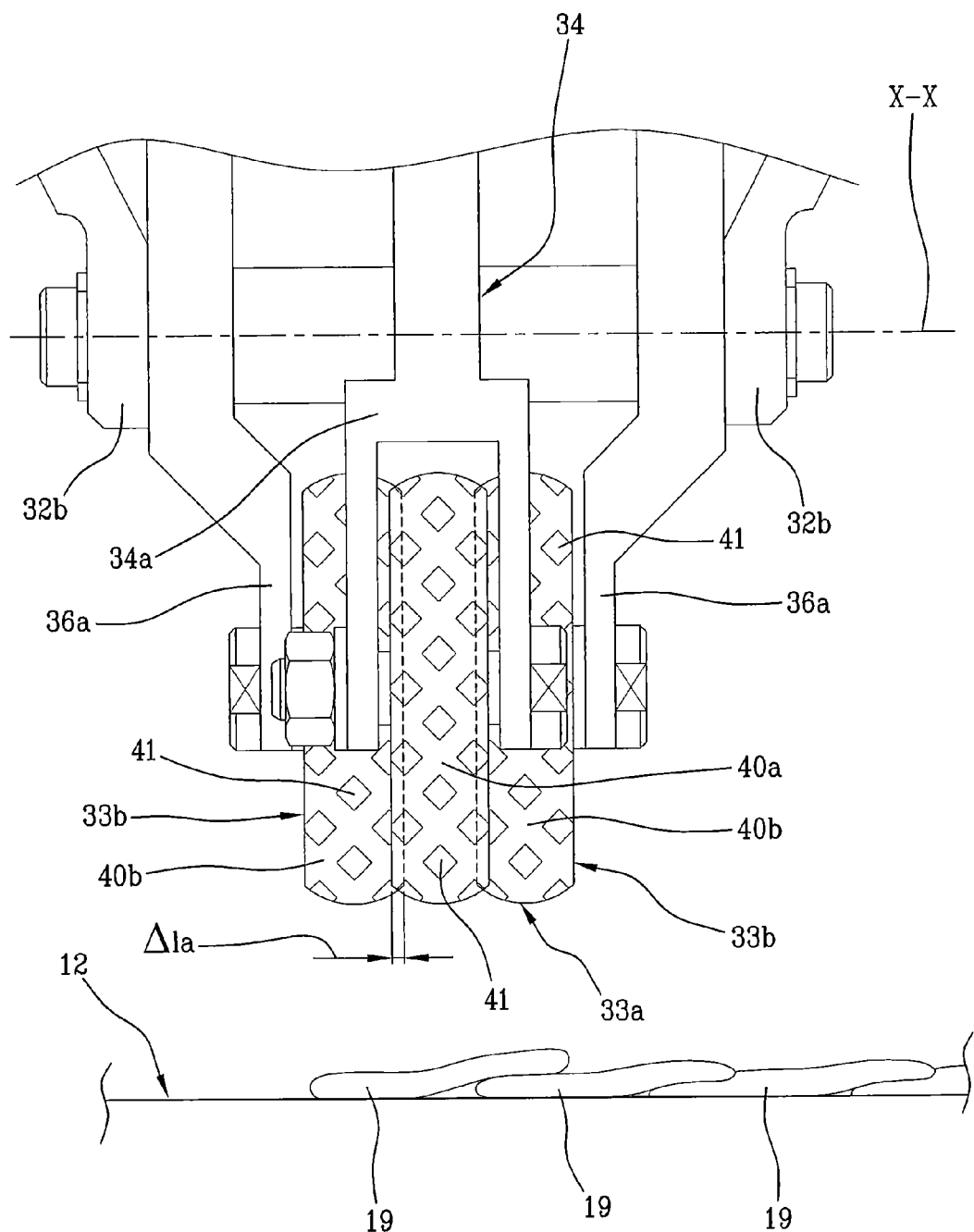
FIG. 5 shows an enlarged portion of the pressure device in FIG. 4b with a forming support carrying a continuous elongated element already laid and spaced apart from the pressure device, for the sake of clarity.
Figure 5A:
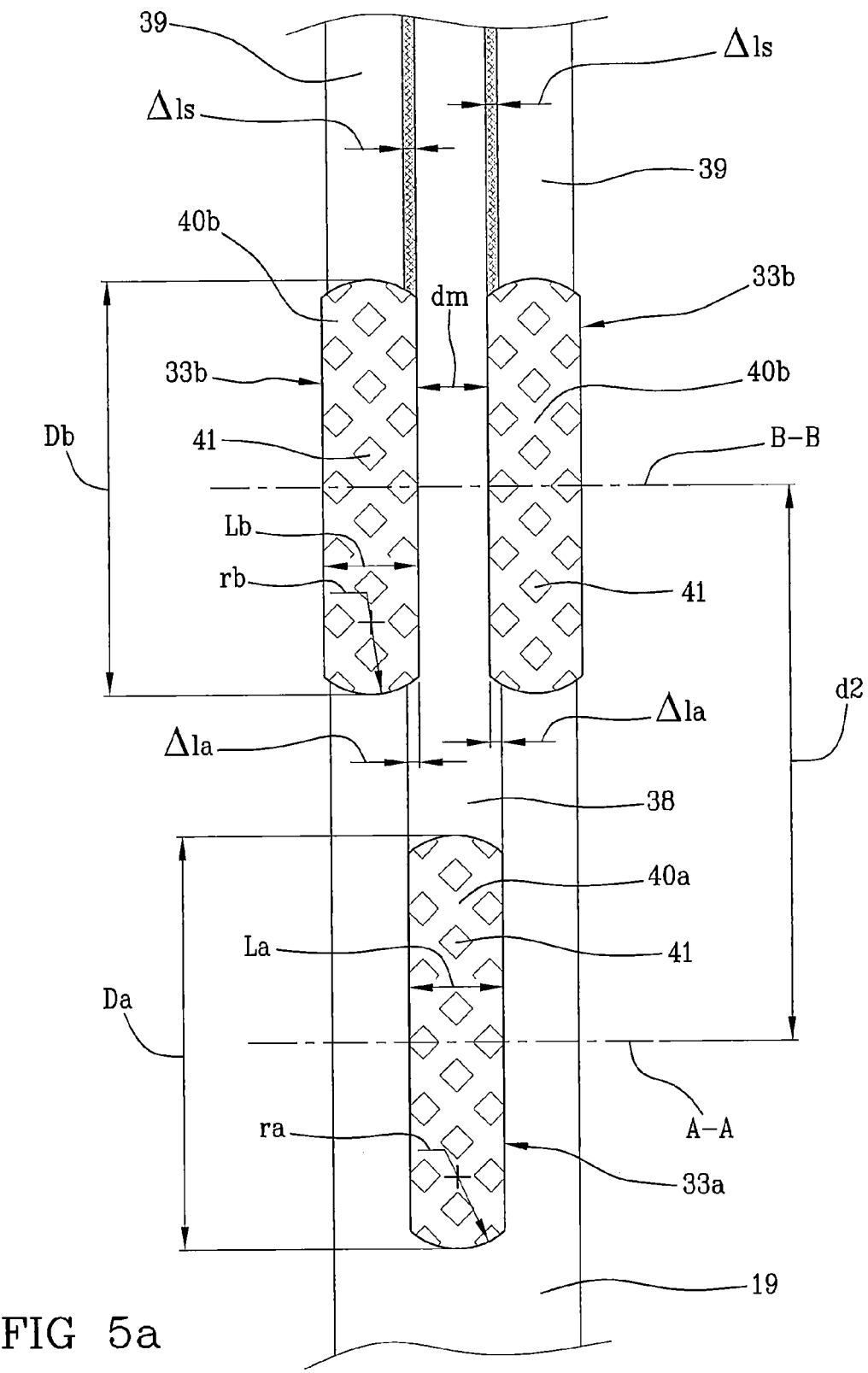
FIG. 5a is a diagrammatic plan view showing rollers of the pressure device acting on the continuous elongated element.

Immediately after laying carried out by the applicator member 21, the central roller 33a exerts a first pressure "$P_1$" on a central region 38 of the just laid portion of the continuous elongated element 19, and subsequently the two side rollers 33b exert respective second pressures "$P_2$" on side regions 39 of the same portion (FIGS. 5 and 5a). The central 33a and side 33b rollers roll against the continuous elongated element 19, that has already adhered to the forming support 12 and rotate in opposite ways relative to the rotation direction of said forming support 12.

Downstream of the pressure device 27, therefore, the continuous elongated element 19 laid on the forming support 12 has a central strip compressed by the central roller 33a and two side strips compressed by the side rollers 33b (FIG. 5a).

The pneumatic cylinders 35, 37 push rollers 33a, 33b against the continuous elongated element 19 and, through the central small arm 34 and lateral small arms 36, maintain rollers 33a, 33b in contact with the continuous elongated element 19. Due to the described structure, the central roller 33a and each of the side rollers 33b are movable independently of each other along a direction substantially orthogonal to the peripheral surface of the forming support 12.

The portion of the continuous elongated element 19 that has just come out of the extruder and has been submitted to said pressures "$P_1$", "$P_2$", has an average temperature "$t_m$" substantially equal to or not much lower than the exit temperature and preferably included between about 90° C. and about 110° C.

Distance "$d_1$" between the rotation axis "C-C" of the applicator roller 21 and the rotation axis "A-A" of the central roller 33a is preferably included between about 20 mm and about 200 mm. Distance "$d_2$" between the rotation axis "A-A" of the central roller 33a and the rotation axis "B-B" of the side rollers 33b is preferably included between about 10 mm and about 100 mm (FIGS. 3 and 5a).

As a result, a first distance "$\Delta S_1$" measured along the application direction between the application device 20 and central roller 33a, intended as the distance measured between the contact point of the applicator roller 21 with the continuous elongated element 19 and the contact point of the central roller 33a with the continuous elongated element 19, is included between about 20 mm and about 220 mm.

A second distance "$\Delta S_2$" measured along the application direction between the central roller 33a and the two side rollers 33b, intended as the distance measured between the contact point of the central roller 21 with the continuous elongated element 19 and the axis passing by the two contact points between the side rollers 33b and the continuous elongated element 19, is included between about 10 mm and about 110 mm.

The periods of time intervening between the action of the applicator roller 21, the action exerted by the central roller 33a and the action exerted by the side rollers 33b on the same portion of continuous elongated element 19 depend on the above stated distances and the linear application speed "V" that is preferably included between about 0.1 m/s and about 2 m/s, more preferably between about 0.5 m/s and about 1.5 m/s.

Between laying of a portion of the continuous elongated element 19 and the pressing action carried out by the central roller 33a on the same portion there is a first time interval "$\Delta T_1$" included between about 0 s and about 1 s. In addition, between the pressing action carried out by the central roller 33a and the pressing action carried out by the two side rollers 33b there is a second time interval "$\Delta T_2$" included between about 0 s and about 1 s.

In the embodiment shown, the peripheral work surface 40a of the central roller 33a has, in diametrical section, an arched and symmetric peripheral contact edge (FIGS. 5 and 5a) which has a radius of curvature "$r_a$" preferably included between about 0.5 mm and about 3 mm. Also the peripheral work surface 40b of each of the side rollers 33b is arched and symmetric (FIG. 5) and has a radius of curvature "$r_b$" preferably included between about 0.5 mm and about 3 mm.

In accordance with an alternative embodiment not shown, said peripheral work surface 40b of each of the side rollers 33b is asymmetric and the edge in contact with the continuous elongated one 19 is the outer edge.

In the embodiment shown in the accompanying drawings, the peripheral work surface 40a of the central roller 33a partly faces the peripheral work surfaces 40b of the two side rollers 33b. In other words, in a front view as the one in FIG. 5, the peripheral work surface 40a of the central roller 33a is partly superposed on the peripheral work surfaces 40b of both the side rollers 33b. The facing or superposition widths "$\Delta 1a$", measured along a direction parallel to the rotation axes of the rollers, are included between about 0.5 mm and about 5 mm.

Width "La" of the peripheral work surface 40a of the central roller 33a is included between about 3 mm and about 10 mm. Width "Lb" of the peripheral work surface 40b of each of the side rollers 33b is included between about 3 mm and about 10 mm.

In addition, the two side rollers 33b are mutually spaced apart by a minimum distance "$d_m$", measure parallel to the rotation axes, included between about 3 mm and about 10 mm.

The central roller 33a and each of the side rollers 33b act on a common region of the continuous elongated element 19. As a result, the continuous elongated element 19 has two parallel bands compressed both by the central roller 33a and the side rollers 33b (FIG. 5a). The central region 38 and side regions 39 and, consequently, the aforesaid central strip and side strips are partly superposed at said bands according to superposition widths "$\Delta ls$" preferably included between about 0.5 mm and about 5 mm.

Due to the width and position of the side rollers 33b, the side edges 41 of the continuous elongated element 19 are compressed and preferably also squashed through an hammering action. To this aim, preferably, the peripheral work surface 40a, 40b of the central roller 33a and/or of the side rollers 33b has a knurling defining raised elements 41 delimiting corresponding grooves.

Alternatively, smooth rollers are used on softer and adhesive compounds for example, where surface working of the rollers could cling to the continuous elongated element of elastomeric material.

The invention claimed is:

1. A process for building a tire for a vehicle wheel comprising:
assembling components of elastomeric material on a forming support, wherein at least one of said components of elastomeric material is manufactured by the steps of:
    i) dispensing a continuous elongated element of elastomeric material in a form of a strip;
    ii) applying, by way of an application roller, a portion of the continuous elongated element in a form of coils disposed at least partly superposed in a radial direction of the forming support, wound on the forming support so as to form said at least one component of elastomeric material of the tire;
    iii) exerting, by way of a central roller distinct from the application roller, a first pressure on a central region of one of the coils of the portion of the continuous elongated element after applying the continuous elongated element onto the forming support; and
    iv) exerting, by way of two side rollers each laterally offset toward opposite sides of the central roller, a second pressure only on side regions of said one of the coils of said portion of the continuous elongated element applied onto the forming support, the side regions being disposed on opposing sides of the central region,
wherein step iv) follows step iii),
wherein the continuous elongated element has a cross-sectional shape, measured perpendicular to a dispensing direction, comprising a width that is greater than a height, the height being measured perpendicular to an application surface of the forming support at a point where the portion is brought into contact with the application surface, and wherein the cross-sectional shape of the continuous elongated element is filled continuously with material,
wherein the central roller and each of the side rollers are movable irrespective of each other along a direction orthogonal to the forming support at a point where the portion is brought into contact with each respective roller,
wherein the central roller is carried by a central small arm hingedly connected to fixed arms about a first articulation axis,
wherein the fixed arms are secured to a supporting frame,
wherein an end of the central small arm, opposite to the central roller, is connected to the supporting frame by a first spring element, wherein the side rollers are carried by lateral small arms each laterally offset toward opposite sides of the central small arm, wherein the lateral small arms are hingedly connected to the fixed arms about the first articulation axis, and wherein an end of each of the lateral small arms, opposite to the respective side roller of each lateral small arm, is connected to the supporting frame by a respective second spring element.

2. The process as claimed in claim 1, wherein a first time interval between 0 s and 1 s intervenes between step ii) and step iii).

3. The process as claimed in claim 1, wherein a duration of time between 0 s and 1 s intervenes between step iii) and step iv).

4. The process as claimed in claim 1, wherein during steps iii) and iv), said portion has an average temperature between about 90° C. and about 110° C.

5. The process as claimed in claim 1, wherein, along a direction orthogonal to the longitudinal extension of the continuous elongated element, the side regions are partly superposed on the central region according to a superposition width.

6. The process as claimed in claim 5, wherein said superposition width is between 0.5 mm and 5 mm.

7. The process as claimed in claim 1, wherein during step iv), a hammering action is exerted on the continuous elongated element.

8. The process as claimed in claim 1, wherein step ii) is carried out at a linear application speed of the continuous elongated element between 0.1 m/s and 2 m/s.

9. The process as claimed in claim 1, wherein, along an application direction, a first distance between a contact point of the application roller and the continuous elongated element and a contact point of the central roller and the continuous elongated element is between about 20 mm and about 200 mm.

* * * * *